Oct. 23, 1951 B. B. JACOBSEN ET AL 2,572,030

FAILURE ALARM ARRANGEMENTS IN MULTICHANNEL CARRIER CURRENT COMMUNICATION SYSTEM

Filed March 25, 1948 3 Sheets-Sheet 1

Inventors
Bent Bulow Jacobsen
Frank Fairley
By R. F. Morris
Attorney

Inventors
Bent Bulow Jacobsen
Frank Fairley
By R P Morris
Attorney

Oct. 23, 1951 B. B. JACOBSEN ET AL 2,572,030

FAILURE ALARM ARRANGEMENTS IN MULTICHANNEL CARRIER CURRENT COMMUNICATION SYSTEM

Filed March 25, 1948 3 Sheets-Sheet 3

Inventors
Bent Bulow Jacobsen
Frank Fairley
By
R P Morris
Attorney

Patented Oct. 23, 1951 2,572,030

UNITED STATES PATENT OFFICE 2,572,030

FAILURE ALARM ARRANGEMENTS IN MULTICHANNEL CARRIER CURRENT COMMUNICATION SYSTEM

Bent Bulow Jacobsen and Frank Fairley, London, England, assignors to International Standard Electric Corporation, New York, N. Y.

Application March 25, 1948, Serial No. 17,076
In Great Britain April 1, 1947

5 Claims. (Cl. 179—15)

Figures 1, 2, 3:
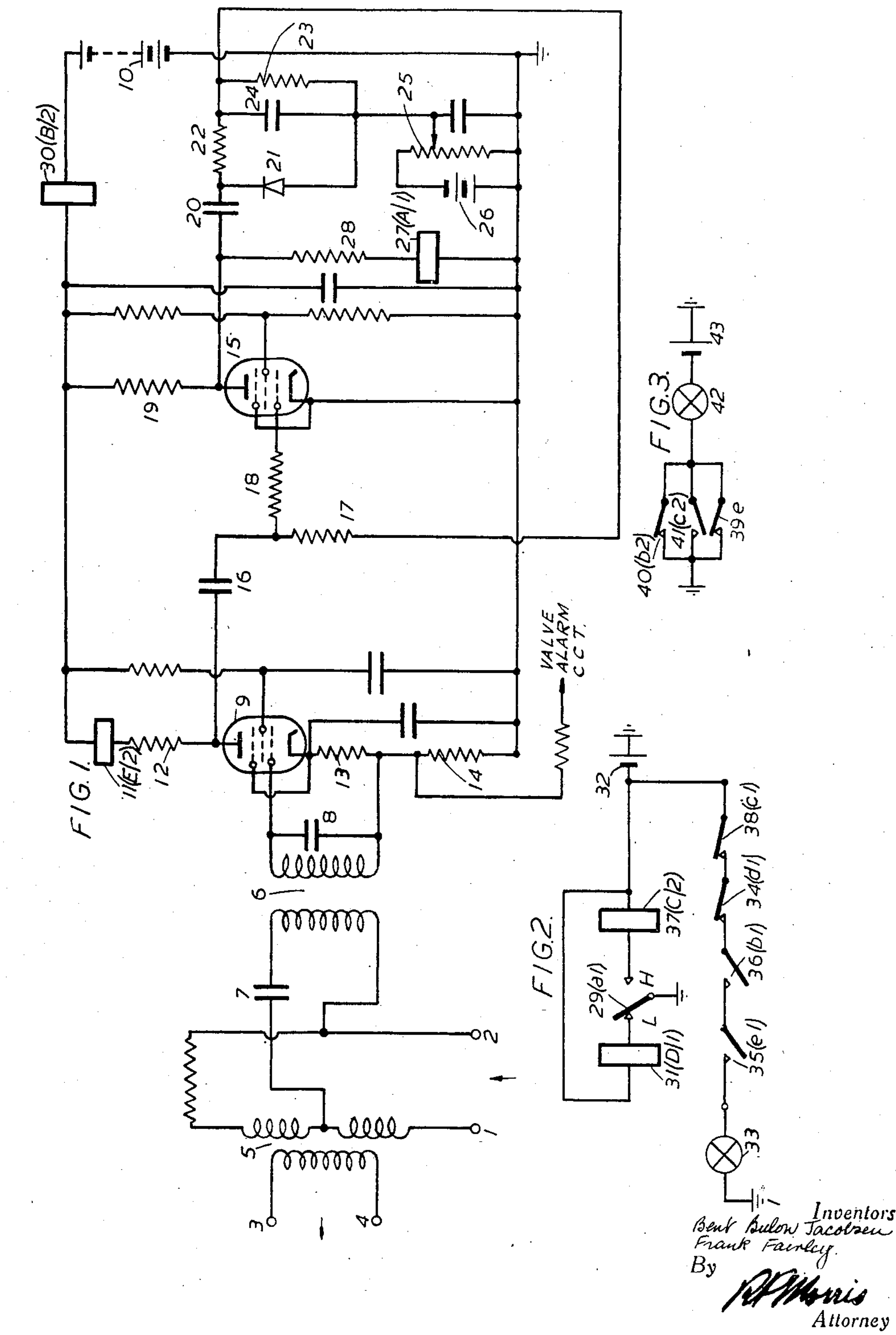

The present invention relates to failure alarm arrangements for multi-channel carrier current communication systems.

In such systems, there is a need for some means of indicating the failure of transmission over a channel or group of channels. Thus, when individual channels are used for automatic dialling, it is important that a busy signal should be available when one or more channels are out of service, in order to prevent a defective channel from being seized by the automatic equipment.

This facility has been provided in the past by employing a pilot current to control the alarm equipment, so that on failure of the pilot current to arrive, the alarm is operated. This has proved satisfactory when there is only one group of channels, for example, but if there are two or more groups, it is generally not desirable for various reasons, and often not convenient, to supply additional pilot currents for alarm purposes.

Multichannel carrier communication systems are commonly of the suppressed carrier type, that is, the modulation products of each channel or group of channels are filtered in such a manner as to pass one of the corresponding side bands without appreciable attenuation; but to reduce the level of the corresponding carrier to as low a value as is practicable. It follows that a carrier leak is, in fact, always present in this type of system, and accordingly, the above-mentioned difficulties are overcome according to the present invention by taking advantage of this carrier leak which is unavoidably present at a sufficient level, to cause the operation of an alarm signal by its disappearance, or reduction to an abnormally low level, on failure of the channel or group of channels.

The invention accordingly provides a channel failure alarm system for a multi-channel carrier current communication system of the suppressed carrier type, comprising means for deriving a carrier current leak from a point in the system and means controlled by the derived current leak for operating an alarm signal when the level of the said current leak falls below a specified minimum.

In a practical multi-channel carrier system in which there are two or more groups of 12 channels, it is found, for example, that the total carrier leak power for a group of 12 channels is not usually less than a power corresponding to about 28 decibels below 1 milliwatt when determined at a point of zero reference level, and may be several decibels greater. According to an embodiment of the invention, a detector is bridged across the circuit at a suitable point after the group demodulator at the receiving end of the system, but before the channels are separated for individual demodulation, and this detector is arranged to amplify and rectify the carrier leak power, and to apply it to a suitable relay or device, which operates a signal or alarm when the total carrier leak power corresponding to the 12 channels falls below the expected level. The detector could, for example, be designed to accept all frequencies in the frequency band covered by the group of 12 channels, which might, for example be from 60 to 108 kilocycles per second; and it might have a sensitivity such that it would operate the alarm when the carrier leak power at a point of zero reference level falls to more than, say, 30 decibels below 1 milliwatt. It will be understood of course, that the detector may quite possibly be placed at some point of other than zero reference level, so that the sensitivity should be adjusted accordingly.

It may be necessary in some cases to restrict the bandwidth accepted by the detector in order to prevent it from picking up frequencies which arise outside the channel group concerned, such as side bands from adjacent groups. Thus the effective band in the case of the example above might be restricted to the limits 68 and 100 kilocycles per second. In any case the detector should not accept the group carrier frequency used at the group demodulator, since the leak at this frequency is not affected by the failure of the group. However, this frequency is usually sufficiently outside the group band (for example it may be 120 kilocycles per second) for this requirement to cause no special difficulty.

The detector in its simplest form might comprise an impedance transforming band pass filter, for example, a double tuned transformer, followed by a single stage amplifier, the output of which is coupled to a leaky grid type of detector. The sensitivity would be such that in the absence of the expected carrier leak, the anode current of the detector would rise to a value sufficient to operate an alarm relay. This simple arrangement has the objection that no alarm would be given if the detector valve should fail, and further a false alarm is given if the amplifier fails. For this reason it is preferable to rectify the output of the amplifier valve using a diode or metal rectifier, and to apply the rectified voltage in positive sense through a high series resistance to the control grid of a valve which would otherwise be blocked by means of a high positive bias on the cathode. The anode current produced when carrier leak is present is then employed to hold up a relay, which releases when the carrier leak disappears, and operates the alarm. This arrangement also gives an alarm if either of the detector valves should fail. The high resistance in series with the grid helps to limit the grid current which might be produced when speech is transmitted over the channels.

Figures 4, 5, 6:
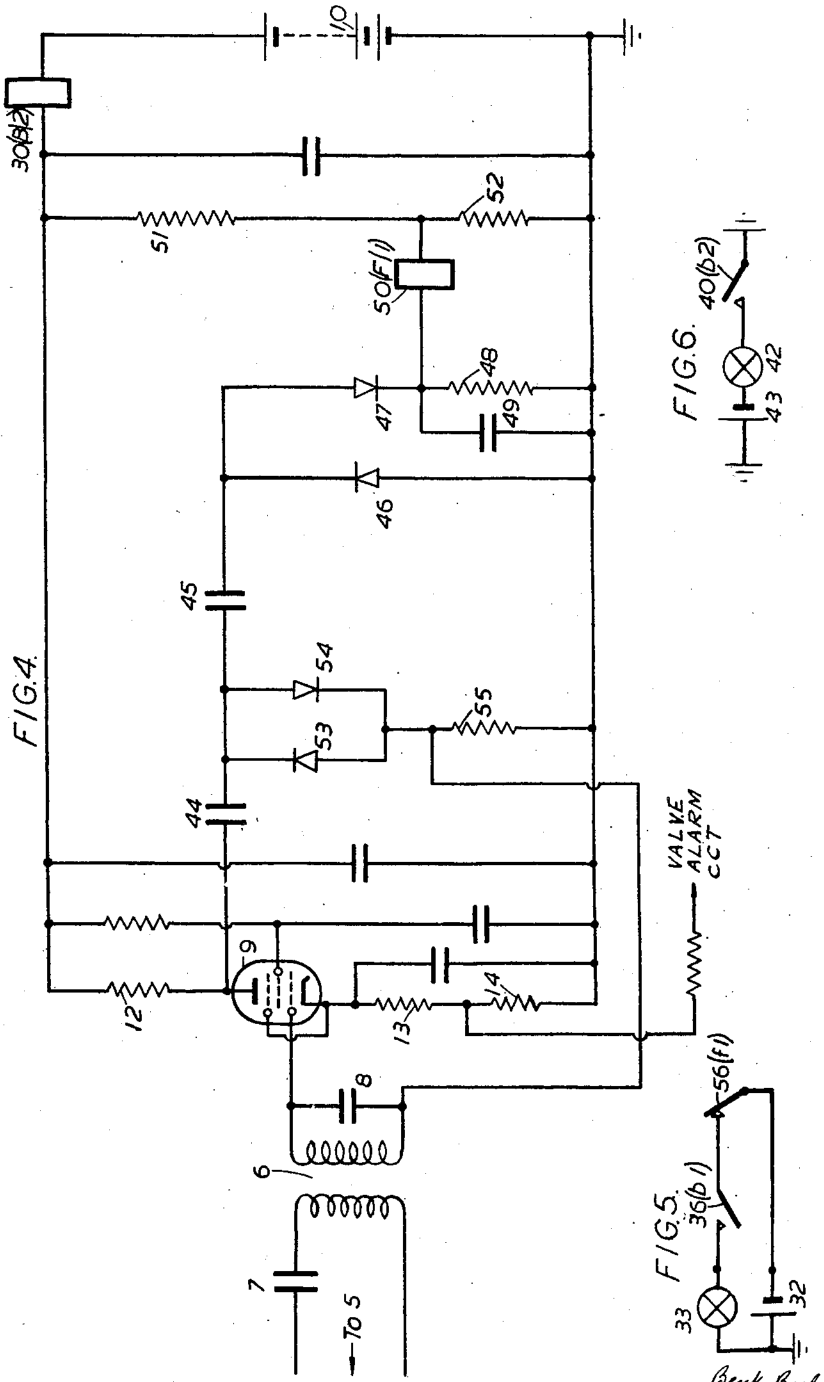
Figure 7:
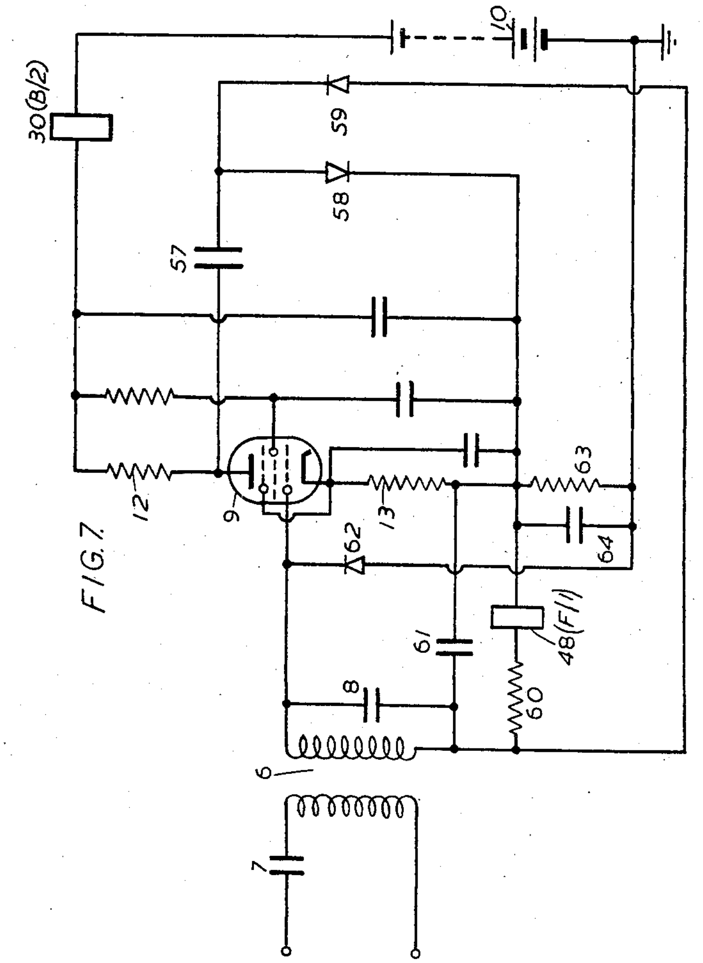

Details of a preferred arrangement of this kind are shown in Figs. 1, 2 and 3 of the accompanying drawings. A simplified arrangement is shown in Figs. 4, 5 and 6; and Fig. 7 shows another simplified arrangement.

In these circuits, relays and the contacts operative thereby are shown detached from one another in order to clarify the circuit diagram. While each relay operating winding and the corresponding contacts are given separate designation numerals, they are designated in addition in brackets by a letter and numeral system by which all the contacts of a given relay may be immediately identified with the corresponding operating winding. Thus each winding is given a capital letter, followed by a numeral indicating the number of sets of contacts operated thereby, and each of the corresponding contacts is given the corresponding small letter and a distinguishing numeral. Thus in Figs. 1, 2 and 3, for example the sets of contacts *e1* and *e2* belong to winding E/2 which has two sets of contacts.

All contacts are shown in the position they assume when there is no current in the corresponding winding.

The circuit shown in Fig. 1 is intended to be connected at the receiving end of the system between the output of a group demodulator (or of the amplifier following the demodulator, if there is one) and the channel filters connecting it to the individual channel demodulators. The output of the group demodulator (or corresponding amplifier) will be connected to terminals 1 and 2 and the input to the channel filters to terminals 3 and 4. These terminals are connected to an unsymmetrical hybrid coil 5 which has a very small transmission loss in the direction from terminals 1, 2 to terminals 3, 4 but has a higher loss, of the order of 7 decibels, for example, in the direction from terminals 1, 2 to the input transformer 6 of the carrier leak alarm circuit. This hybrid coil largely prevents any frequencies appearing at the input to the channel filters from travelling backwards into the alarm circuit and thereby falsely holding this circuit in the clear condition. The input transformer 6 has been built out as a band pass filter (half section) by means of a series condenser 7 on the primary side and a shunt condenser 8 on the secondary side. Other forms of filter could of course be used here, but a simple filter gives sufficient discrimination against frequencies which it is desired to exclude from the alarm circuit.

The transformer 6 is connected between the grid and cathode of a valve 9 conventionally arranged as a voltage amplifier, and operated from a high tension source 10. It is provided with an anode relay 11 (E/2) in series with the anode resistance 12 for the purpose of giving an alarm indicating the failure of anode current, and also to prevent a false carrier leak alarm caused by valve failure from being given. The cathode circuit is provided with series resistances 13 and 14, the first of which provides suitable bias for the control grid, and the other produces a standard voltage which may be applied to a valve failure alarm circuit (not shown).

The output from the valve 9 is coupled to the second valve 15 through a series condenser 16, shunt resistance 17, and a high grid series resistance 18 (20,000 ohms). The valve 15, initially works as an ordinary amplifier valve with an anode resistance 19, and the output from the anode is taken through condenser 20 to a half-wave rectifier 21 connected through a resistance 22 to a load resistance 23 shunted by a condenser 24. The rectified voltage developed across the resistance 23 is applied to the grid of the valve 15 through the grid leak resistance 17 and increases both the anode current and the mutual conductance of the valve. This is rectified reaction. Apart from the rectified potential across resistance 23 a further bias potential (about 3½ volts negative) is applied to the grid of valve 15 from a potentiometer 25 connected across a negative bias source 26. A marginal relay 27 (A/1) is connected in series with a resistance 28 between the anode of the valve 15 and ground. This relay has a set of change-over contacts 29 (*a1*, see Fig. 2) and when unenergised, the armature makes on the left hand fixed contact. The potentiometer 25 should be adjusted so that in the absence of a signal, the anode current is, for example, about 2 milliamps; and the anode voltage by virtue of this current and the anode resistance 19, the resistance of the marginal relay 27, and the resistance 28 will be approximately 110 volts. Should the valve fail, this voltage will rise to 220 volts, for example, and this will cause the relay 27 to operate contacts 29 so that the armature touches the right hand or "high" contact, indicating failure of the valve 15. In the presence of signal, however, the anode current will be increased by the rectified signal voltage across resistance 23, and this will cause the current through relay 27 to be reduced and, at the critical (just sufficient) input, this current should be such that the armature will just make on the left hand or "low" contact. The relay 30 (B/2) is connected in series with the high tension source 10 to detect failure of this source.

The arrangement of the alarm circuit is shown in Fig. 2. When the carrier leak at a normal level is present, the relay contacts 29 cause relay 31 (D/1) to operate from the source 32, and the connection to the channel alarm signal 33 is broken by the opening of the contacts 34 (*d1*), so no alarm is given. It will be remembered that relays 11 and 30 are both operated so that the corresponding contacts 35 (*e1*) and 36 (*b1*) are closed. When the carrier leak level is subnormal, the armature of contacts 29 will be in the neutral mid position and relay 31 will be released and the alarm circuit is completed by the closing of contact 34. It will be clear that if the source 10 or the valve 9 should fail, the alarm circuit will be broken by contacts 36 or 35 respectively. Should valve 15 fail, the relay 27 will receive a high operating current, and the armature of contacts 29 (Fig. 2) will make on the right-hand or "high" contact. The relay 37 (C/2) will operate, and contacts 38 (*c1*) will break the alarm circuit.

Thus it will be clear that the alarm circuit is broken if either of the valves 9 or 15, or the source 10, should fail, so no alarm is given. This is essential since it is not desired to produce a busy signal when the alarm circuit fails. If the alarm circuit is in proper order, a busy signal is produced by the closing of contacts 34 in response to a carrier leak failure, as desired. It is however, also desirable to operate a signal when there is a fault in the alarm circuit and this is carried out by the circuit shown in Fig. 3. The release of relay 11 or 30, or the operation of relay 37, by means of the corresponding contacts 39 (e2), 40 (b2) or 41 (c2) will close the circuit for an alarm lamp 42 to a source 43, and if necessary for an audible alarm circuit (not shown), and the maintenance personnel can then deal with the trouble.

The arrangement shown, while being very sensitive to small carrier leak inputs, will not give false alarms when the input is increased even by as much as 50 decibels. In the normal arrangement, valve 9 would not take grid current, even with this overload. Valve 15, will, however take grid current for very powerful input signals, and the condenser 16 will, for that reason, build up a negative potential which tends to reduce the anode current of valve 15 if the input signal were suddenly to be reduced to the critical value. The negative charge on condenser 16 due to the grid current is, however, fairly small owing to the high value of the series grid resistance 18, and is completely neutralised by the positive voltage applied to the grid circuit from the resistance 23 due to the input signal. When the input signal suddenly disappears, the anode current will not be reduced, provided the time contact of the elements 23 and 24 is long compared to the time constant of the circuit incorporating the condenser 16. With this proviso, the anode current will slowly be reduced to the value appropriate to the steady signal existing after the reduction, but will not be reduced excessively initially, as would be the case if there has been a cumulative gain reduction. The high value inputs are of course produced when the speech side-bands are powerful, and the total speech side-bands reaching the alarm circuit will vary quickly within very wide limits.

Figs. 4, 5 and 6 show an alternative circuit which is slightly less sensitive, using only one valve. Those elements which are the same as corresponding elements in Figs. 1, 2 and 3 have been given the same designation numbers. The anode of the valve 9 is connected through two blocking condensers 44 and 45 to a conventional voltage doubler rectifier circuit comprising oppositely directed rectifiers 46 and 47, the latter having in series therewith a load resistance 48 in parallel with a condenser 49. The junction point of 47 and 48 is connected through a relay 50 (F/1), which corresponds to relay 27 of Fig. 1, to the junction point of two resistances 51 and 52 connected to the source 10. Two parallel connected oppositely directed rectifiers 53 and 54 and a series resistance 55 connect the junction point of the condensers 44 and 45 to ground. The upper end of resistance 55 is connected through the transformer 6 to the control grid of the valve 9. The rectifiers 53 and 54 act as a nonlinear voltage-dependent resistance, and the arrangement provides negative feedback the magnitude of which increases as the output voltage of the valve increases. The rectifiers 53 and 54 could be replaced by any other type of voltage-dependent resistance, the magnitude of which decreases as the applied voltage increases.

The feedback for very high output is almost complete; pracically the whole of the output voltage is fed back, so that the voltage amplification ratio of the amplifier valve is reduced nearly to unity. For normal or small input signals, the gain is determined by anode load and mutual conductance in the ordinary way, and the degree of compression obtained is therefore nearly equal to the initial amplification of the valve. The gain reduction by feedback is noncumulative so that if the input signal after being very high, for instance due to speech currents, is suddenly reduced to the normal value, the current in the relay 50 will be reduced, but will not at any time go below the current associated with a normal signal. The rectifiers 46 and 47 are blocked by the voltage obtained from the resistances 51 and 52. Very small signals, therefore, give no rectified current whatever but when the signal approaches the normal value, the rate of increase of current is higher. The alarm circuit for this case is shown in Fig. 5. When the current through relay 50 is low, the contact 56 (f1) is made and completes the alarm circuit through the made contact 36 of relay 30. This relay indicates the presence of current from the source 10, and therefore checks both the valve 9 and the source 10, and so no relay corresponding to relay 11 (Fig. 1) is necessary. If either the valve or the source should fail, no channel alarm will be given, but the subsidiary circuit, Fig. 6, will provide the necessary indication of the failure of the alarm circuit itself.

Another single valve arrangement according to the invention is shown in Fig. 7. The anode of the amplified valve 9 is connected through a blocking condenser 57 to a voltage doubler rectifier circuit comprising the rectifiers 58 and 59, and the load consisting of the resistance 60 in series with the relay 48, shunted by the condenser 61. The resistance 14 of Figs. 1 and 4 is in this case omitted, and the lower end of the secondary winding of the transformer 6 is connected through condenser 61 to the lower end of resistance 13. A rectifier 62 which acts as a nonlinear voltage-dependent resistance connects the control grid of the valve 9 to ground, and a resistance 63 shunted by a condenser 64, for biassing negatively the anode of the rectifier 62, is inserted between the lower end of resistance 13 and ground.

The rectifier provides a shunt circuit for the input transformer 6, the impedance of which is controlled by the rectifier output. For small or normal input levels, the circuit consists effectively of the amplifier valve 9 with a voltage doubler rectifier, in the output circuit of which the relay 48 is connected. When the output increases beyond the normal value, the rectified output from the voltage doubler rectifier is applied through the input transformer 6 to the rectifier 62 and reduces the impedance of this rectifier, and thereby reduces the input voltages to the valve. The impedance reduction is determined by the current through the relay 48, so that, if the input signal is suddenly reduced from a very large value to the normal value, the current through 48 will never fall below the value appropriate for the normal input, and therefore no false alarm results from overloading of the circuit. The rectifier 62 is initially blocked by the potential created across resistance 63 by the space current of the valve 9. The capacity of rectifier 62 is neutralised by the inductance of the input transformer; in other words, the capacity of the rectifier forms part of the total shunt capacity required for the secondary winding of the transformer. The alarm circuits could be exactly as shown in Figs. 5 and 6.

It will be clear that for the success of any of the alarm devices which have been described, carrier leak from other sources than the channel group concerned must be prevented from reaching the detector; for example carrier leak might be transmitted backwards from the individual channel demodulators which occur after the test point. This is prevented by the use of the hybrid coil 5 shown in Fig. 1.

It is evident that the same circuits could be applied to detecting the failure of a super group, or of a single channel, by connecting the hybrid coil between the output of the super-group, or channel, demodulator and the following circuit.

It would also be possible to check the carrier leak level at repeater stations in both directions.

It will be clear that at a terminal, the check is made on channels or groups which are received at that terminal. Since if one direction has failed the other direction is of no value, this other direction may be used for signalling the fault to the other terminal by causing the alarm device to disconnect the sending equipment of the first terminal, thereby causing disappearance of the carrier leak in the said other direction.

Any suitable type of alarm signal or device may be used, and it may be self-restoring, or require restoration by hand. It could be designed to produce visible and/or audible signals, as well as a busy signal to the automatic equipment, indicating an engaged condition. It could be designed if required, to apply a tone to a subscriber's line either directly, or through the receiving equipment.

If desired, also, the effect of the alarm could be delayed in order to guard against short time accidental interruptions, for which an alarm is not required.

It may be added, that should the normal carrier leak level be too low for reliable operation of the alarm system, one or more of the modulators could be slightly unbalanced in order to ensure a sufficient carrier leak level.

What is claimed is:

1. A multi-channel carrier current communication system of the suppressed carrier type wherein no monitoring signals are transmitted and the entire transmission band for a given line is occupied exclusively by frequencies of intelligence modulated signals, in combination with a channel failure alarm arrangement comprising, frequency selective means deriving from a point in the system carrier current leak energy corresponding to at least one channel, the derived energy having at least a given level under normal transmission conditions, a normally inoperative alarm, and means whereby said alarm is operated by said derived leak energy of a level below said given level.

2. A multi-channel carrier current communication system of the suppressed carrier type wherein no monitoring signals are transmitted and the entire transmission band for a given line is occupied exclusively by frequencies of intelligence modulated signals and comprising a group demodulator, channel filters and individual channel demodulators, in combination with a channel failure alarm arrangement comprising, means including a hybrid coil connected between said group demodulator and said channel filters for branching out a small portion of the total demodulated multi-channel energy and preventing backward transmission of energy from said channel filters, filter means coupled to an output of said hybrid coil for selecting the branched out energy corresponding to at least one channel, said last mentioned energy having at least a given level under normal transmission conditions, a normally inoperative alarm, and means whereby said alarm is operated in response to the selected branched out energy of a level below said given level.

3. A system according to claim 2 in which said means whereby said alarm is operated in response to the selected branched out energy of a level below said given level comprises, at least one amplifier tube having a grid electrically coupled to an output terminal of said filter means, a rectifier in the output circuit of said amplifier tube and means whereby the rectified output of the said amplifier tube is applied to its grid and operates a relay controlling the operation of said alarm.

4. A system according to claim 2 in which said means whereby said alarm is operated in response to the selected branched out energy of a level below said given level comprises, an amplifier having an input bridged across said filter means, a rectifier in the output of said amplifier, means whereby the rectified output of said amplifier operates a relay to actuate said alarm, and a non-linear resistance shunted across the input of said amplifier, the resistance of said non-linear resistance decreasing as the output of said amplifier increases.

5. A system as set forth in claim 1 wherein said alarm operating means comprises a circuit including a source of power and at least one amplifier, in combination with additional means whereby said alarm is prevented from operating upon failure of either said source of power or one of said amplifiers.

BENT BULOW JACOBSEN.
FRANK FAIRLEY.

REFERENCES CITED

The following references are of record in the file of this patent:

UNITED STATES PATENTS

| Number | Name | Date |
|---|---|---|
| 1,804,526 | Coxhead | May 12, 1931 |
| 2,059,870 | Holmes | Nov. 3, 1936 |
| 2,371,263 | Preston | Mar. 13, 1945 |
| 2,379,069 | Dysart | June 26, 1945 |
| 2,396,990 | Dysart | Mar. 19, 1946 |
| 2,460,789 | Thompson | Feb. 1, 1949 |
| 2,478,320 | Riordan | Aug. 9, 1949 |